(12) United States Patent
Jansen et al.

(10) Patent No.: US 8,008,798 B2
(45) Date of Patent: Aug. 30, 2011

(54) WIND TURBINE DRIVETRAIN SYSTEM

(75) Inventors: Patrick L. Jansen, Scotia, NY (US);
Gary R. Barnes, Delanson, NY (US);
Kiruba S. Haran, Clifton Park, NY (US);
Ronghai Qu, Clifton Park, NY (US);
Adam D. Minadeo, Greenville, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 12/646,240

(22) Filed: Dec. 23, 2009

(65) Prior Publication Data

US 2011/0133469 A1    Jun. 9, 2011

(51) Int. Cl.
*F03D 9/00* (2006.01)
*H02P 9/04* (2006.01)
(52) U.S. Cl. ............................................. 290/55; 290/44
(58) Field of Classification Search .................... 290/44, 290/55
See application file for complete search history.

(56) References Cited

U.S. PATENT DOCUMENTS

| | | | | |
|---|---|---|---|---|
| 3,549,918 A * | 12/1970 | Van Hout et al. | ........... | 310/49.17 |
| 3,693,034 A * | 9/1972 | Inariba | ........... | 310/49.03 |
| 3,894,621 A | 7/1975 | Quick | ........... | 192/109 R |
| 4,187,735 A | 2/1980 | Terry | ........... | 74/410 |
| 4,369,668 A | 1/1983 | Pollak-Banda et al. | ........ | 74/414 |
| 4,871,934 A | 10/1989 | Okamoto et al. | ............ | 310/166 |
| 5,229,677 A | 7/1993 | Dade et al. | ........... | 310/268 |
| 6,135,729 A | 10/2000 | Aber | ........... | 417/420 |
| 6,445,105 B1 * | 9/2002 | Kliman et al. | .......... | 310/268 |
| 6,617,739 B1 * | 9/2003 | Kinoshita | ........... | 310/198 |
| 6,817,507 B2 | 11/2004 | Yeon | ........... | 226/188 |
| 6,867,524 B2 | 3/2005 | Liang | ........... | 310/156.47 |
| 7,105,975 B2 * | 9/2006 | Semones et al. | ........ | 310/216.008 |
| 7,391,128 B2 | 6/2008 | Rozmus | ........... | 290/55 |
| 7,410,442 B2 | 8/2008 | Fox | ........... | 475/343 |
| 7,472,619 B2 | 1/2009 | Leimann | ........... | 74/424.5 |
| 7,508,108 B2 * | 3/2009 | Makita et al. | ........... | 310/49.11 |
| 7,750,522 B2 * | 7/2010 | Gizaw et al. | ........... | 310/156.01 |
| 2002/0067091 A1 * | 6/2002 | Kliman et al. | ........... | 310/156.01 |
| 2004/0119374 A1 | 6/2004 | Carl, Jr. et al. | ........... | 310/268 |
| 2004/0251759 A1 * | 12/2004 | Hirzel | ........... | 310/114 |
| 2004/0251761 A1 * | 12/2004 | Hirzel | ........... | 310/156.25 |
| 2005/0040728 A1 * | 2/2005 | Hirzel | ........... | 310/268 |
| 2005/0073212 A1 * | 4/2005 | Semones et al. | ........... | 310/216 |
| 2006/0244336 A1 | 11/2006 | Makita et al. | ........... | 310/216.075 |
| 2008/0036215 A1 * | 2/2008 | Gizaw et al. | ........... | 290/55 |
| 2008/0246362 A1 * | 10/2008 | Hirzel | ........... | 310/156.02 |

(Continued)

*Primary Examiner* — Pedro J Cuevas
(74) *Attorney, Agent, or Firm* — James W. Pemrick; Ernest G. Cusick; Frank A. Landgraff (57) ABSTRACT

A wind turbine is provided having a drivetrain with a gearbox and a gearbox housing, at least one gear stage and an output shaft coupled within the housing. The gear stage exerts an axial thrust force on the output shaft during operation of the wind turbine. A generator includes a generator housing and an input shaft connected to the output shaft of the gearbox. The generator includes a rotor and a stator coupled to the generator housing. The rotor is coupled to the input shaft such that the rotor is positioned radially inward from the stator. At least one bearing is shared between the gearbox output shaft and the generator input shaft, and this bearing carries a portion of the axial thrust force. The generator is skewed to exert an opposing axial thrust force on the input shaft, so that the axial thrust force carried by the bearing is reduced.

25 Claims, 6 Drawing Sheets

U.S. PATENT DOCUMENTS

| | | | |
|---|---|---|---|
| 2009/0058094 A1 | 3/2009 | Jansen et al. | 290/55 |
| 2009/0085354 A1 | 4/2009 | Tan et al. | 290/44 |
| 2010/0251539 A1* | 10/2010 | Gizaw et al. | 29/598 |
| 2011/0037545 A1* | 2/2011 | Sivasubramaniam et al. | 335/216 |
| 2011/0074164 A1* | 3/2011 | Kobayashi | 290/1 R |
| 2011/0133590 A1* | 6/2011 | Lokhandwalla et al. | 310/156.53 |
| 2011/0136617 A1* | 6/2011 | Lopez et al. | 475/331 |
| 2011/0143880 A1* | 6/2011 | Minadeo et al. | 475/346 |

* cited by examiner

WIND TURBINE DRIVETRAIN SYSTEM

BACKGROUND OF THE INVENTION

The field of the disclosure relates generally to wind turbines and, more particularly, to a drivetrain for a wind turbine having reduced axial loads.

Wind is usually considered to be a form of solar energy caused by uneven heating of the atmosphere by the sun, irregularities of the Earth's surface, and rotation of the Earth. Wind flow patterns are modified by the Earth's terrain, bodies of water, and vegetation. The terms "wind energy" and "wind power" describe a process by which wind is used to rotate a shaft and subsequently generate mechanical power or electricity.

Some known wind turbines are used to convert the kinetic energy in the wind into mechanical power. This mechanical power may be used for specific tasks (such as grinding grain or pumping water) or a generator may convert this mechanical power (i.e., the rotation of a shaft) into electricity. A wind turbine usually includes an aerodynamic mechanism (e.g., blades) for converting the movement of air into a mechanical motion (e.g., rotation), which is then converted with a generator into electrical power. Power output from the generator is proportional to the cube of the wind speed. As wind speed doubles, the capacity of wind generators increases almost eightfold.

Some known, commercially available wind turbines utilize geared drivetrains to connect the turbine blades to the electrical generators. The wind turns the turbine blades, which spin a low speed shaft, which feeds into a gearbox having a higher speed output shaft. This higher speed output shaft connects to a generator and makes electricity. The geared drive aims to increase the velocity of the mechanical motion.

BRIEF DESCRIPTION OF THE INVENTION

One aspect of the present invention provides a wind turbine having a drivetrain. The drivetrain includes a gearbox having a gearbox housing, at least one gear stage and an output shaft rotatably coupled within the housing. The at least one gear stage exerts an axial thrust force on the output shaft during operation of the wind turbine. A generator includes a generator housing and an input shaft. The input shaft of the generator is connected to the output shaft of the gearbox. The generator also includes a stator and a rotor. The stator is coupled to the generator housing, and the rotor is coupled to the input shaft such that the rotor is positioned radially inward from the stator. At least one bearing is shared between the gearbox output shaft and the generator input shaft, and this at least one bearing carries at least a portion of the axial thrust force. The generator is skewed to exert an opposing axial thrust force on the input shaft, so that the axial thrust force carried by the bearing is reduced.

Another aspect of the present invention provides a wind turbine having a drivetrain. The drivetrain includes a gearbox having a gearbox housing, at least one gear stage and an output shaft rotatably coupled within the housing. The at least one gear stage exerts an axial thrust force on the output shaft during operation of the wind turbine. A generator includes a generator housing and an input shaft connected to the output shaft of the gearbox. The generator also includes a stator and a rotor, where the stator is coupled to the generator housing, and the rotor is coupled to the input shaft such that said rotor is positioned radially inward from the stator. At least one bearing is shared between the gearbox output shaft and the generator input shaft. This at least one bearing carries at least a portion of the axial thrust force. The generator is skewed to reduce at least one of torque ripple and cogging torque.

Yet another aspect of the present invention provides a wind turbine having a drivetrain. The drivetrain includes a gearbox having a gearbox housing, at least one gear stage and an output shaft rotatably coupled within the housing. The at least one gear stage exerts an axial thrust force on the output shaft during operation of the wind turbine. A generator includes a generator housing and an input shaft connected to the output shaft of the gearbox. The generator also includes a stator and a rotor, where the stator is coupled to the generator housing, and the rotor is coupled to the input shaft such that the rotor is positioned radially inward from the stator. At least one bearing is shared between the gearbox output shaft and the generator input shaft, and this at least one bearing carries at least a portion of the axial thrust force. The generator is skewed to exert an opposing axial thrust force on the input shaft, so that the axial thrust force carried by the at least one bearing is reduced, and at least one of torque ripple and/or cogging torque is reduced.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF THE INVENTION

Figure 1:
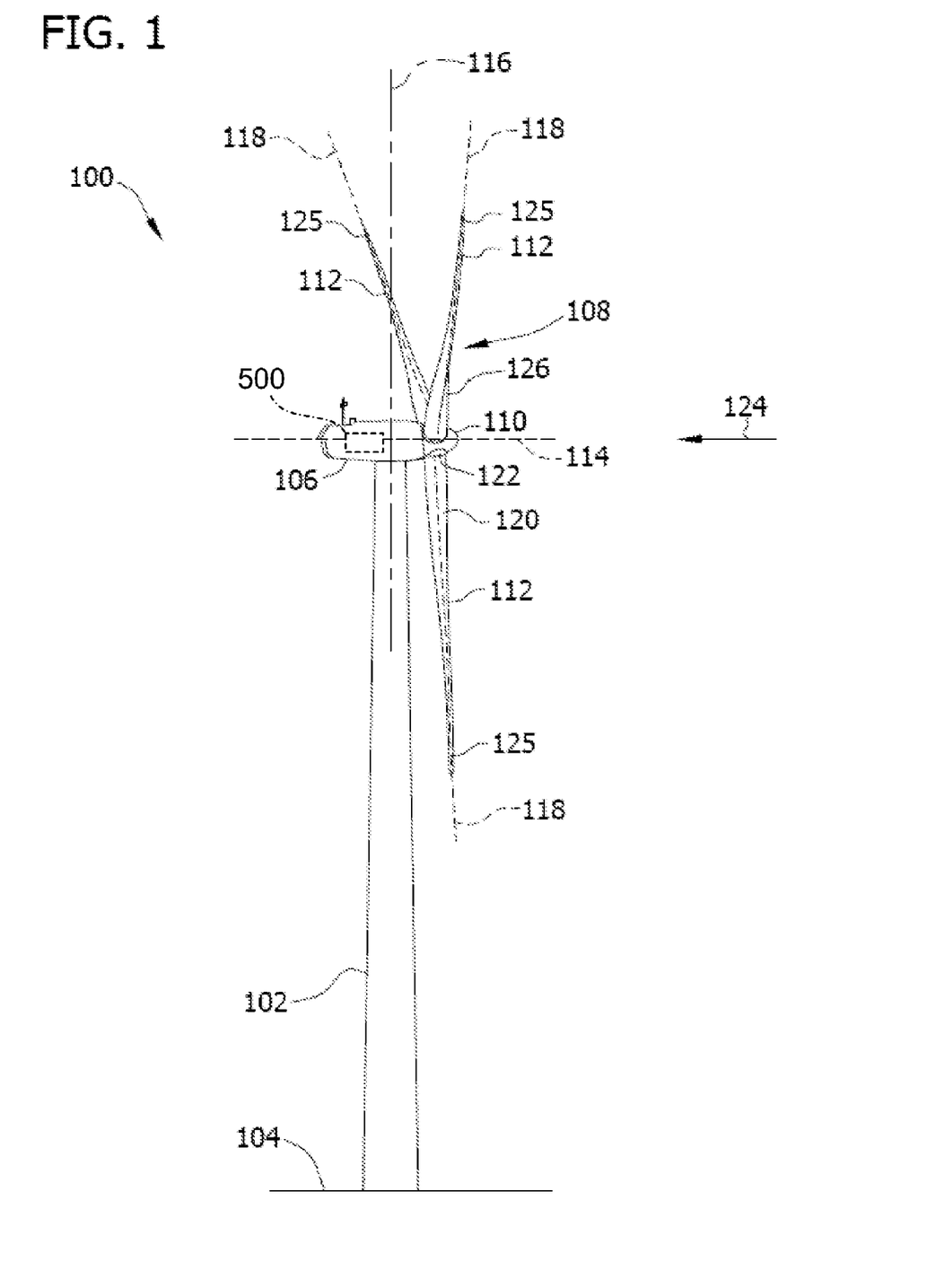
FIG. 1 is a side perspective view of an exemplary wind turbine.

FIG. 1 is a schematic view of an exemplary wind turbine 100. In the exemplary embodiment, wind turbine 100 is a horizontal axis wind turbine. Alternatively, wind turbine 100 may be a vertical axis wind turbine. Wind turbine 100 has a tower 102 extending from a supporting surface 104, a nacelle 106 coupled to tower 102, and a rotor 108 coupled to nacelle 106. Rotor 108 has a rotatable hub 110 and a plurality of rotor blades 112 coupled to hub 110. In the exemplary embodiment, rotor 108 has three rotor blades 112. Alternatively, rotor 108 has any number of rotor blades 112 that enables wind turbine 100 to function as described herein. In the exemplary embodiment, tower 102 is fabricated from tubular steel and has a cavity (not shown in FIG. 1) extending between supporting surface 104 and nacelle 106. Alternatively, tower 102 is any tower that enables wind turbine 100 to function as described herein including, but not limited to, a lattice tower. The height of tower 102 is any value that enables wind turbine 100 to function as described herein.

Blades 112 are positioned about rotor hub 110 to facilitate rotating rotor 108, thereby transferring kinetic energy from wind 124 into usable mechanical energy and, subsequently, electrical energy. Rotor 108 and nacelle 106 are rotated about tower 102 on a yaw axis 116 to control a perspective of blades 112 with respect to a direction of wind 124. Blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in blades 112 are transferred to hub 110 via load transfer regions 122. Each blade 112 also includes a blade tip portion 125.

In the exemplary embodiment, blades 112 have a length between 30 meters (m) (98 feet (ft)) and 70 m (229 ft), however these parameters form no limitations to the instant disclosure. Alternatively, blades 112 may have any length that enables wind turbine generator to function as described herein. As wind 124 strikes each blade 112, blade lift forces (not shown) are induced on each blade 112 and rotation of rotor 108 about rotation axis 114 is induced as blade tip portions 125 are accelerated. A pitch angle (not shown) of blades 112, i.e., an angle that determines a perspective of each blade 112 with respect to the direction of wind 124, may be changed by a pitch adjustment mechanism (not shown in FIG. 1). Specifically, increasing a pitch angle of blade 112 decreases a blade surface area 126 exposed to wind 124 and, conversely, decreasing a pitch angle of blade 112 increases blade surface area 126 exposed to wind 124.

Figure 2:
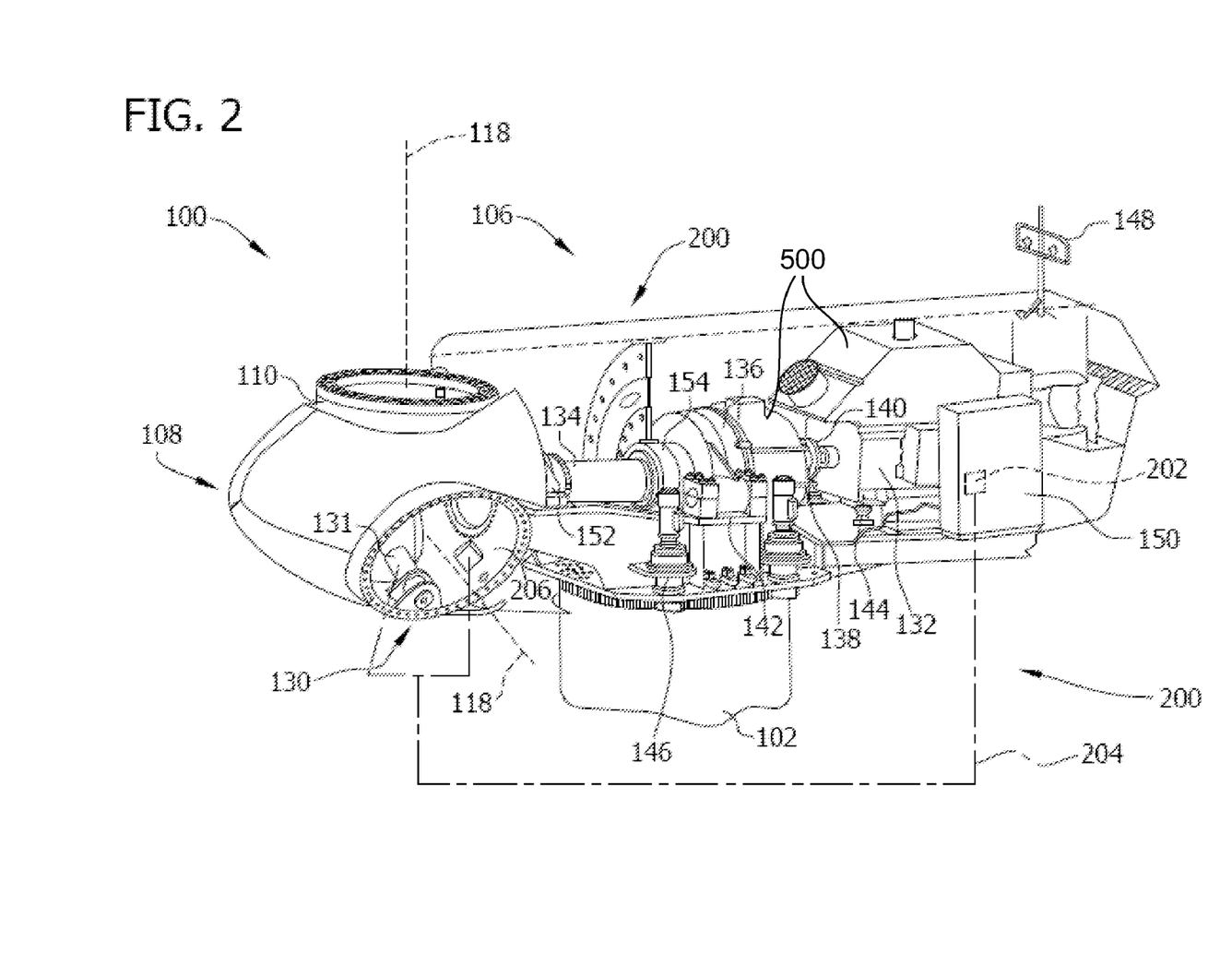
FIG. 2 is a partial cross-sectional schematic view of a nacelle used with the exemplary wind turbine shown in FIG. 1.

FIG. 2 is a cross-sectional schematic view of nacelle 106 of exemplary wind turbine 100. Various components of wind turbine 100 are housed in nacelle 106 atop tower 102 of wind turbine 100. Nacelle 106 includes one pitch drive mechanism 130 that is coupled to one blade 112 (shown in FIG. 1). Pitch drive mechanism 130 modulates the pitch of associated blade 112 along pitch axis 118. Only one of three pitch drive mechanisms 130 is shown in FIG. 2. In the exemplary embodiment, each pitch drive mechanism 130 includes at least one pitch drive motor 131.

Nacelle 106 also includes rotor 108 that is rotatably coupled to an electric generator 132 positioned within nacelle 106 via rotor shaft 134 (sometimes referred to as a low speed shaft), a gearbox 136, a high speed shaft 138, and a coupling 140. Rotation of rotor shaft 134 rotatably drives gearbox 136 that subsequently rotatably drives high speed shaft 138. High speed shaft 138 rotatably drives generator 132 via coupling 140 and high speed shaft 138 rotation facilitates production of electrical power by generator 132. Gearbox 136 and generator 132 are supported by supports 142 and 144, respectively. Alternatively, in direct drive configurations, main rotor shaft 134 is coupled directly to generator 132 via coupling 140.

Nacelle 106 further includes a yaw drive assembly 146 that may be used to rotate nacelle 106 and rotor 108 on axis 116 (shown in FIG. 1) to control the perspective of blades 112 with respect to the direction of wind 124, as described in more detail herein. Nacelle 106 also includes at least one meteorological mast 148. Mast 148 includes a wind vane and anemometer (neither shown in FIG. 2). Mast 148 provides information to a turbine control system (not shown) that may include wind direction and/or wind speed. A portion of the turbine control system resides within a control panel 150. Nacelle 106 further includes forward and aft support bearings 152 and 154, respectively. Support bearings 152 and 154 facilitate radial support and alignment of rotor shaft 134.

Wind turbine generator 100 includes a pitch control system 200. In one embodiment, at least a portion of pitch control system 200 is positioned in nacelle 106. Alternatively, at least a portion of pitch control system 200 is positioned outside nacelle 106. Specifically, at least a portion of pitch control system 200 described herein includes at least one processor 202 and a memory device (not shown), and at least one input/output (I/O) conduit 204, wherein conduit 204 includes at least one I/O channel (not shown). More specifically, processor 202 is positioned within control panel 150. Pitch control system 200 substantially provides a technical effect of wind turbine noise reduction as described herein. Pitch control system 200 also includes a plurality of independent blade pitch position feedback devices 206 coupled with processor 202 via at least one I/O conduit 204. In the exemplary embodiment, each pitch drive mechanism 130 is associated with a single blade pitch position feedback device 206. Alternatively, any number of blade pitch position feedback devices 206 are associated with each pitch drive mechanism 130.

Figure 3:
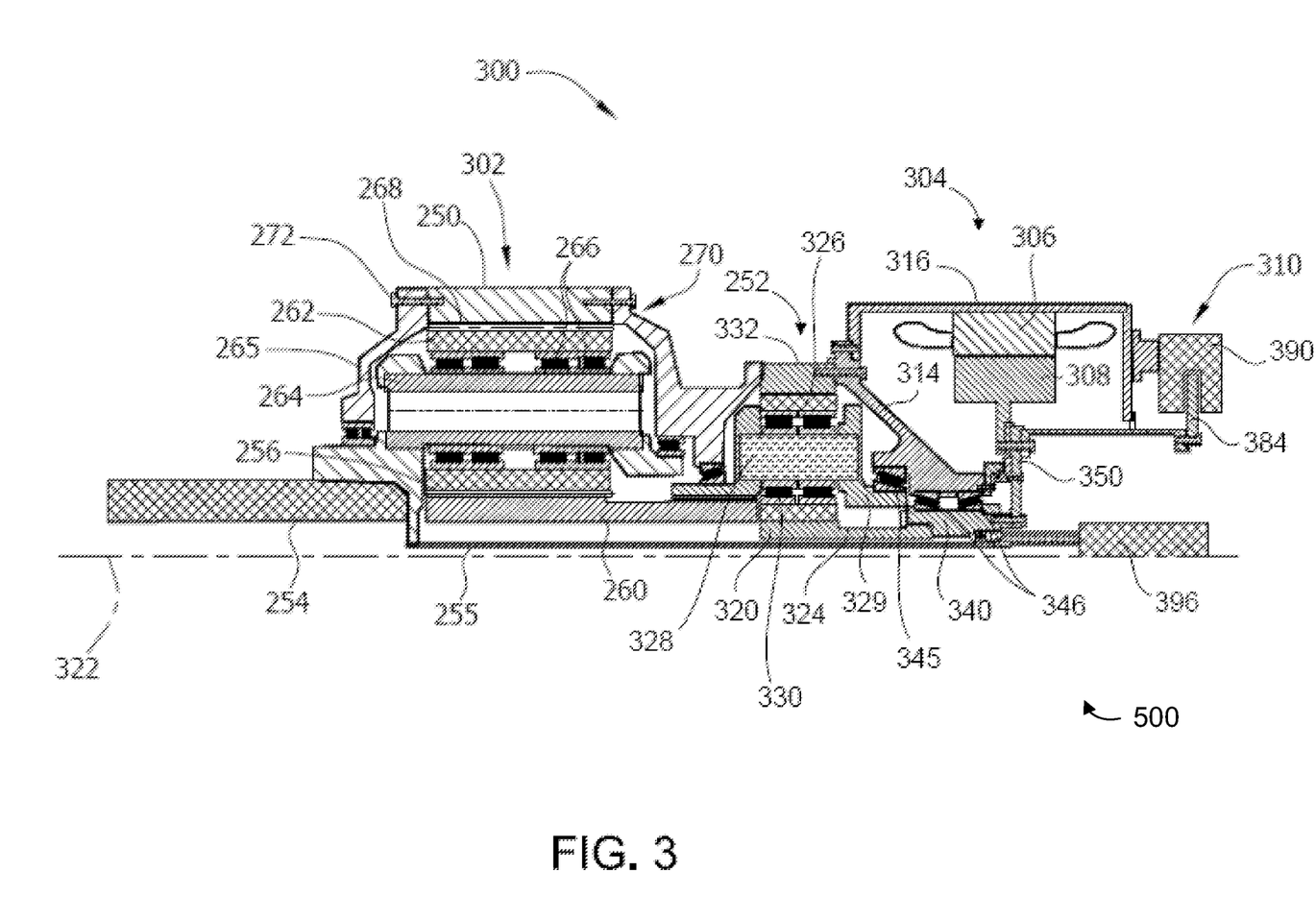
FIG. 3 is a cross-sectional schematic view of an exemplary drivetrain that may be used with the exemplary wind turbine shown in FIG. 1.

FIG. 3 is a cross-sectional schematic view of an exemplary drivetrain 300 that may be used with exemplary wind turbine 100 shown in FIG. 1. In the exemplary embodiment, drivetrain 300 includes a gearbox 302 that is operatively coupled to a generator 304 having a stator 306, a rotor 308 and a braking system 310 that facilitates stopping the rotation of wind turbine 100 (shown in FIG. 1). Gearbox 302 includes a first gear stage 250 operatively coupled and driven by turbine rotor (low-speed) shaft 254. In the exemplary embodiment and as shown in FIG. 3, first gear stage 250 includes a sun pinion 256 that rotates about an axis of rotation 322. Sun pinion 256 includes a sun pinion shaft 260 that provides a mechanical input to a second gear stage 252. A plurality of planetary gears 262 engage sun pinion 256 and rotate about planet carrier pins 264 via a plurality of gearbox planetary bearings 266. Planet carrier pins 264 are rigidly housed in a planet carrier, which rotates about carrier bearings. Each planetary gear 262 engages a ring gear 268 that is fixedly coupled to a radially outer portion 270 of housing 265 via a plurality of fasteners 272.

In the exemplary embodiment, second gear stage 252 includes a housing 314 that is coupled to a generator stator housing 316. Second gear stage 252 includes a sun pinion 320 that rotates about an axis of rotation 322. Sun pinion 320 includes a sun pinion shaft 324 that provides a mechanical input to generator 304, as described in more detail herein. A plurality of planetary gears 326 engage sun pinion 320 and rotate about planet carrier pins 328 via a plurality of gearbox planetary bearings 330. The planet carrier pins 328 are rigidly housed in a planet carrier 329 which rotates about the gearbox carrier bearing 345. Each planetary gear 326 engages a ring gear 332 that is fixedly coupled to a radially outer portion of housing 314 via a plurality of fasteners. Alternatively, drivetrain 300 includes any type of gearbox and arrangement of sun and planetary gear combinations that enable wind turbine 100 to function as described herein, such as a compound planetary, a single simple planetary, and a differential planetary gearbox. In a further alternative embodiment, gearbox bearing 330 may include any type of bearings including, but not limited to, cylindrical, spherical, tapered and ball bearings.

Drivetrain 300 includes a gearbox output shaft 340. In the exemplary embodiment, gearbox output shaft 340 can be coupled to sun pinion shaft 324 so that both rotate about axis of rotation 322 within housing 314 via a plurality of gearbox output shaft bearings 346. The gearbox output shaft 340 is coupled to a radially inner portion of a substantially arcuate coupling disk 350 via a plurality of fasteners. Rotor 308 includes a radially inwardly-extending spider that is coupled to a radially outer portion of coupling disk 350 via a plurality of insulated bolts or fasteners. An insulating ring can be positioned between coupling disk 350 and the spider to form a substantially insulated rotor joint. In the exemplary embodiment, a labyrinth seal is positioned between the rotor and coupling disk 350.

During wind turbine generator operation, the insulated rotor joint protects the gearbox output shaft bearings 346 and gearbox bearings 345 and 330 from harmful electrical voltages and currents by increasing the impedance in the path to the bearings for high-frequency common-mode induced voltages and currents from power electronic converters (not shown) connected to the generator stator 306.

In the exemplary embodiment, braking system 310 extends in an aft direction from generator 304. More specifically and in the exemplary embodiment, stator housing 316 includes an aft wall defining an aperture therethrough that is substantially centered about axis of rotation 322. Braking system 310 includes a substantially cylindrical torque tube that is coupled at a first end to coupling disk 350 via insulating bolts or fasteners.

In the exemplary embodiment, braking system 310 includes a brake disk 384 that is fixedly coupled to a second end of the torque tube via a plurality of fasteners. In the exemplary embodiment, braking system 310 includes at least one brake caliper 390 that is coupled to the aft wall and is sized and oriented to receive a portion of brake disk 384 therein. An integrated gearbox/generator unit reduces an overall size and weight of the drivetrain by eliminating unused space within generator stator housing 316. Such a design also allows for gearbox output shaft bearing 346 to be contained within gearbox 302, and facilitate sharing lubricant that is required for proper functionality of bearings 330 and 346.

In the exemplary embodiment, the various fasteners can be nut/bolt combinations. Alternatively, the fasteners may be any fastening device that enables drivetrain 300 to function as described herein, such as for example, a threaded rod or stud, a welded joint, a screw and/or a rivet, or any combination thereof.

In the exemplary embodiment, a pitch tube extends the length of gearbox 302 and generator 304, and houses power and control wiring (not shown) that extends from blade pitch drive mechanisms 130 to control panel 150, thereby providing a physical location for I/O conduit 204. A pitch tube bearing (not shown) provides support while enabling rotation of pitch tube 392. A slip ring assembly 396 is coupled to an aft end of the pitch tube, and provides an electrical connection for the wiring housed within the pitch tube.

Figure 4:
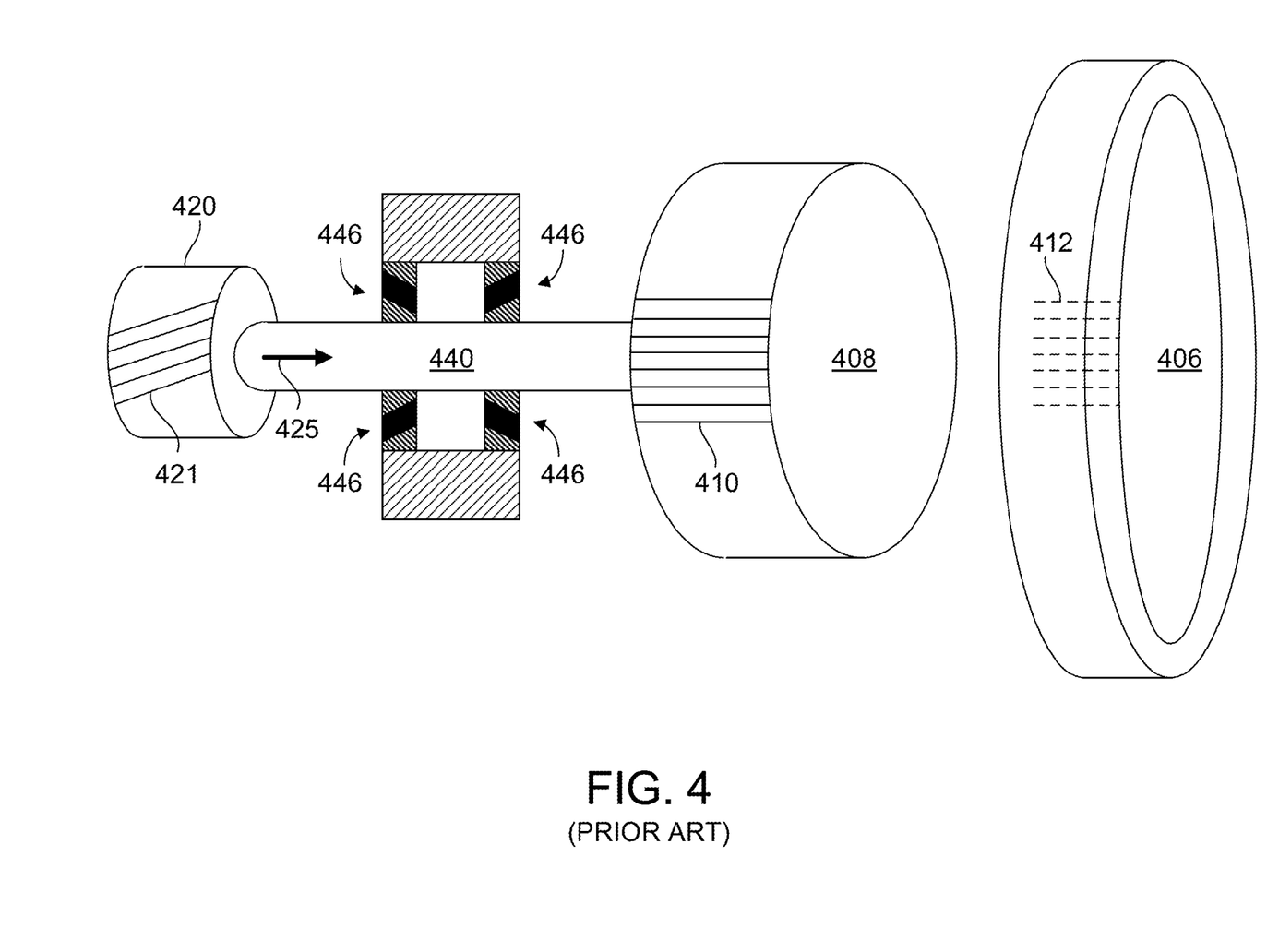
FIG. 4 illustrates a simplified, partial schematic view of one known compact geared drivetrain.

FIG. 4 illustrates a simplified, partial schematic and partially exploded view of one known integral (compact) geared drive train for wind turbines. The gearbox output shaft and generator rotor input shaft share a set of tapered roller bearings 446. The roller bearings 446 are sized to handle the axial thrust loading from the helical gear mesh of the second stage sun gear 420, as well as the radial loading from the weight of the generator rotor 408. The sun gear 420 has a helical gear mesh 421 with a "left-hand" skew orientation that results in an axial thrust force 425 directed toward the generator during normal wind turbine operation (via shaft 440) rotating in a clockwise direction (as viewed facing downwind). The generator rotor 408 has windings (and/or magnetic poles or permanent magnets) 410 that are in-line or parallel to the axis of rotation of the rotor 408. The generator stator 406 has windings 412 that are also in-line or parallel to the axis of rotation of the rotor 408. The result of this arrangement is that a net axial thrust force 425 is exerted on bearings 446. This axial thrust force can degrade the bearings over time and force the use of larger bearings and/or expensive materials to carry this load.

Figure 5:
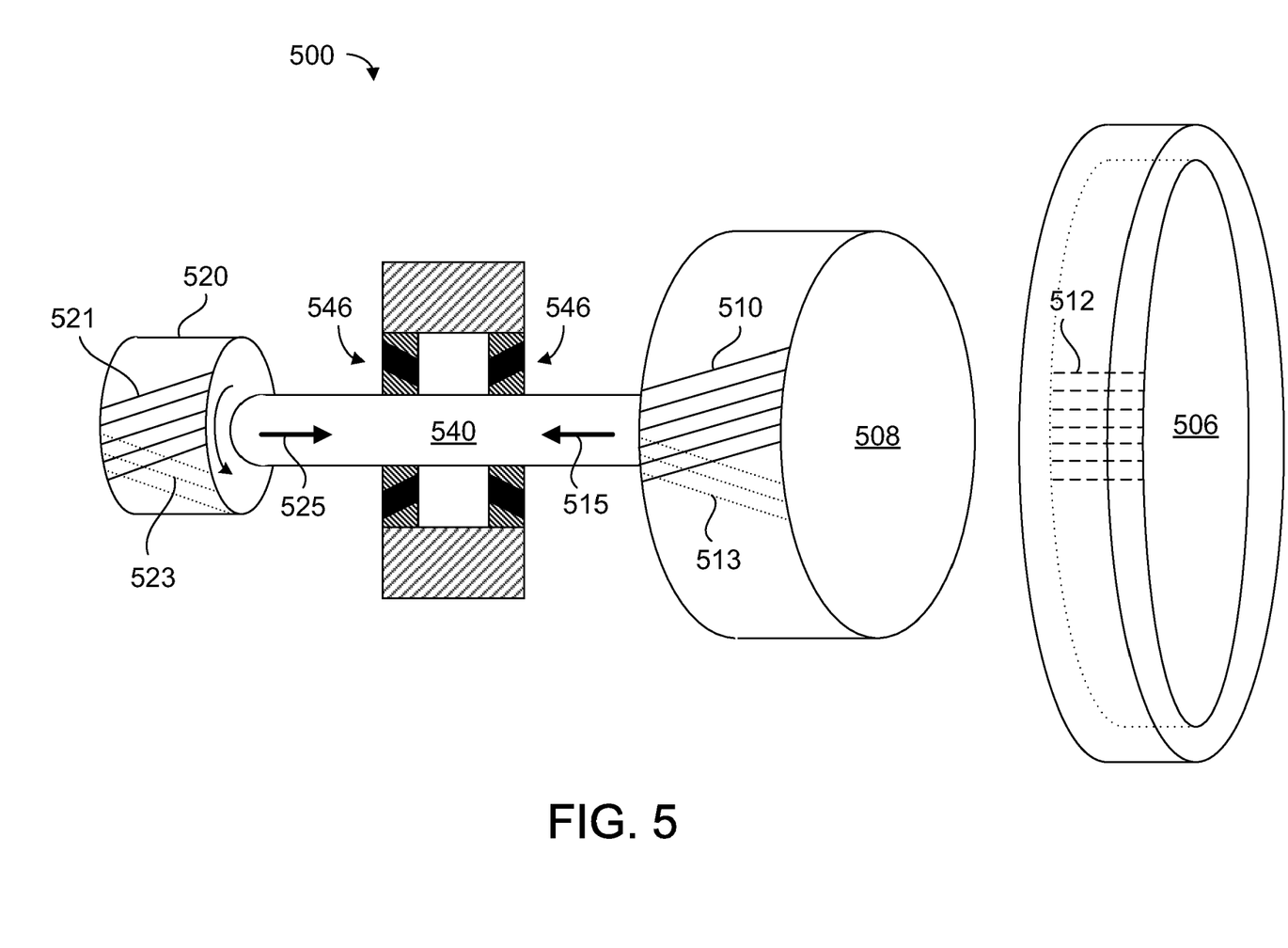
FIG. 5 illustrates a simplified, partial schematic view of a compact geared drivetrain, according to an aspect of the present invention.

FIG. 5 illustrates a simplified, partial schematic and partially exploded view of a compact geared drivetrain 500, according to an aspect of the present invention. The generator bearing axial thrust loads created by the helical gearing of the gearbox output (high-speed) shaft pinion gear are significantly reduced via the introduction of skewing of the generator stator (or rotor). The skewing (helical or straight) is oriented in such a manner to create an electromagnetically-induced axial thrust force that opposes the axial thrust from the helical gearing or the sun gear in the gearbox. Thereby, the axial load of the integral generator bearings are reduced and the bearing life is improved, and/or a reduced size/cost for the integral generator bearings is enabled.

The gearbox output shaft and generator rotor input shaft (which may be a single common shaft 540) share a set of tapered roller bearings 546. The sun gear 520 has a helical gear mesh 521 with a "left-hand" skew orientation that results in an axial thrust force 525 directed toward the generator during wind turbine operation (via shaft 540). The generator rotor 508 has windings 510 that are intentionally skewed with a "left-hand" orientation to create an opposing axial thrust force 515 from the electromagnetic (EM) fields. The generator stator 506 may have windings 512 that are in-line or parallel to the axis of rotation of the rotor 408. The net axial thrust force that must be carried by the bearings 546 is thereby reduced, their lifespan is extended and/or the size/cost of the bearings can be reduced. It is to be understood that the rotor 508 and/or stator 506 may have skewed windings for the effect of reducing the net axial thrust force that is carried by bearings 546.

Figure 6:
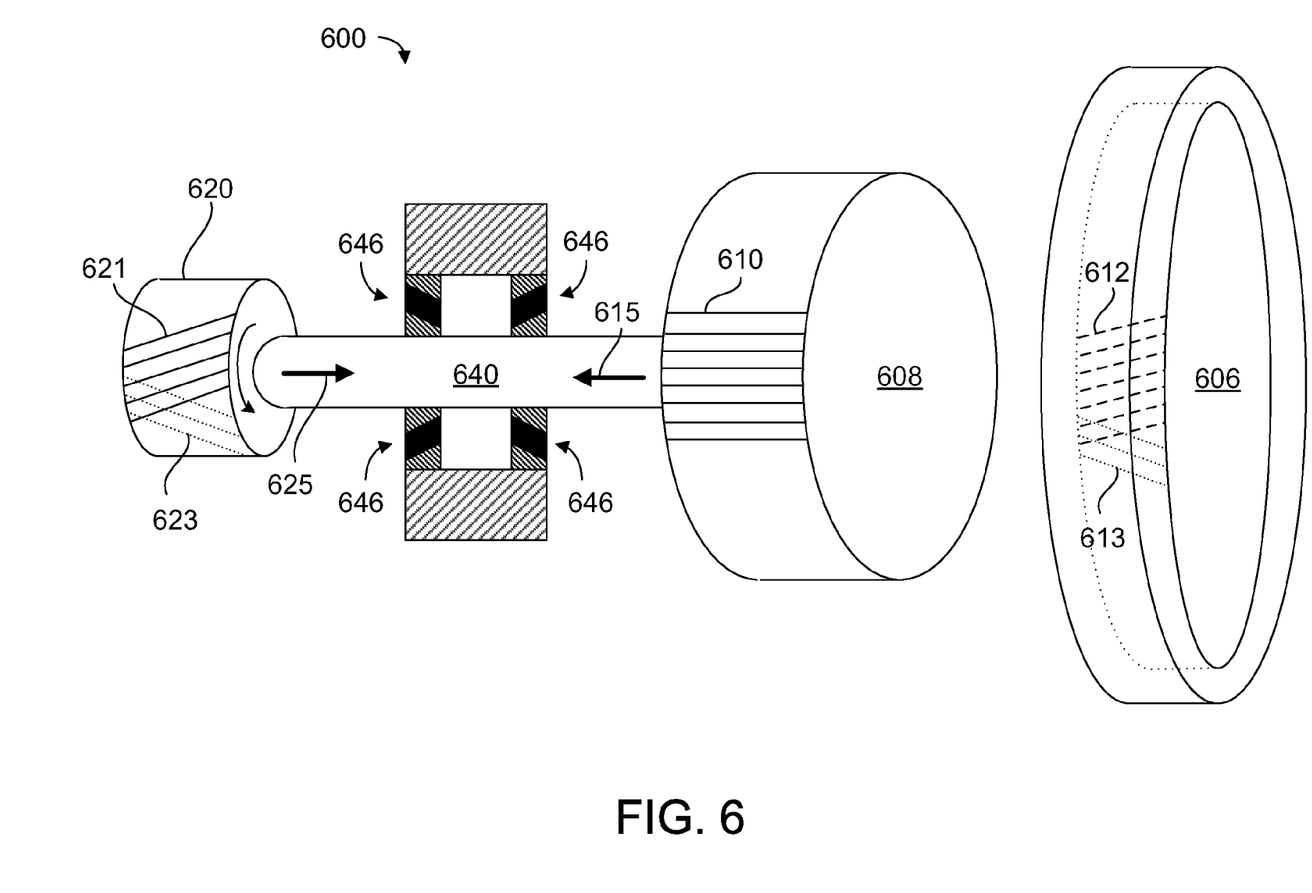
FIG. 6 illustrates a simplified, partial schematic view of a compact geared drivetrain, according to an aspect of the present invention.

FIG. 6 illustrates a simplified, partial schematic and partially exploded view of a compact geared drivetrain 600 according to another aspect of the current invention where the last stage of the gearbox has a sun gear 620 with a helical gear mesh 621 with a "left-hand" skew orientation that results in an axial thrust force 625 directed toward the generator during normal wind turbine operation (via shaft 640) rotating in a clockwise direction (as viewed facing downwind). The generator stator 606 has windings 612 that are intentionally skewed with a "left-hand" orientation to create an opposing axial thrust force 615 from the electromagnetic (EM) fields. The generator rotor 608 has windings 610 that are in-line or parallel to the axis of rotation of the rotor 608. The net axial thrust force that must be carried by the bearings 646 is thereby reduced, their lifespan increased and/or the size/cost of the bearings may be reduced.

In aspects of the present invention the gear mesh 523 (shown in phantom) or the gear mesh 623 (shown in phantom) of the sun gear can be oriented with a "right-hand" skew, in which case, either the generator stator would contain windings 613 (shown in phantom) having a "right-hand" skew, or the rotor would contain windings 513 (shown in phantom) having a "right-hand" skew. Additionally, the gear mesh skew orientation of the sun gear (or other gears within the gearbox) can be designed to create an axial thrust force directed away from the generator. In this case, the generator skew would be designed such that an axial thrust EM force would be directed away from the gearbox, thereby reducing the net loading on the bearings.

Due to the reduction in axial thrust forces carried by the gearbox/generator bearings a number of advantages are realized. Some of these advantages include reduced bearing axial load and improved bearing life. In general, for a 2.5 MW wind turbine with a PM (permanent magnet) generator, the bearing life may be improved up to 20-30% or more depending on nominal bearing load. As a result of bearing life improvement, the system reliability will be improved and maintenance cost will be reduced. As the system availability increases the wind turbine can produce more power due to high reliability or less maintenance time, which results in cost and operational benefits. There is also the potential to switch to a smaller and lower cost bearing.

The skewed stator and/or rotor in the generator also provides the benefit of reducing torque ripple and/or cogging torque. Torque ripple and cogging torque is a common characteristic in permanent magnet generators and results in undesirable noise and vibration. The use of a skewed stator and/or skewed rotor reduces the amount of torque ripple and/or cogging torque. Typical amounts of generator skew (stator or rotor) range from zero to several stator slot pitches, with a skew of one stator slot pitch being common to essentially eliminate the torque ripple component associated with stator slotting, which is typically the largest.

In conventional generators (and motors), the axial force created by generator skew is unwanted and must be handled by generator bearings. In the compact geared drivetrain of the present invention, the generator does not have its own set of bearings, but instead must utilize the gearbox output shaft bearings. In both individual gearboxes with helical skewed gearing and individual generators with stator and/or rotor skew, undesirable axial forces are created that must be handled by their respective bearings, thereby increasing the size and/or cost, or reducing the life of the bearings. An aspect of the present invention teaches that by tightly integrating/coupling a gearbox with helical gearing and a generator with skew to the extent that the gearbox and generator share a common bearing or set of bearings, an additional benefit beyond the obvious benefits of overall system compactness and bearing number reduction can be created. This additional benefit is the significant reduction in the axial loading experienced by, and hence required for, the common/shared bearing(s) when the helical and skew angles are of certain relative orientations as taught in this specification. Aspects of the invention further teach that intentionally introducing generator skewing of a certain orientation in such compact geared drivetrains, can provide significant benefits.

Exemplary embodiments of drivetrain assemblies for wind turbines are described in detail above. The above-described drivetrain assemblies provide an integrated gearbox/generator unit that reduces an overall size and weight of the drivetrain by eliminating unused space within the generator housing and reducing the frame length of the wind turbine. Such a design allows for generator bearings to be contained within the gearbox, and further facilitates sharing lubricant between generator and gearbox bearings. Further, embodiments described herein provide a drivetrain that enables a generator rotor center of gravity (CG) to be substantially axially aligned with the generator bearings. Such a design facilitates reducing loads exerted on the generator bearings during operation and further facilitates increasing an operational life of the bearings.

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

While the apparatus and methods described herein are described in the context of drivetrain assemblies for use with wind turbines, it is understood that the apparatus and methods are not limited to wind turbine applications. Likewise, the system components illustrated are not limited to the specific embodiments described herein but, rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine having a drivetrain, said drivetrain comprising:
   a gearbox comprising a gearbox housing, at least one gear stage and an output shaft rotatably coupled within said housing, said at least one gear stage exerting an axial thrust force on said output shaft during operation of said wind turbine;
   a generator comprising a generator housing and an input shaft, the input shaft of said generator connected to the output shaft of said gearbox, the generator further comprising a stator and a rotor, said stator coupled to said generator housing, said rotor coupled to said input shaft such that said rotor is positioned radially inward from said stator, the generator including stator windings and rotor windings;
   at least one bearing shared between the gearbox output shaft and the generator input shaft, said at least one bearing carrying at least a portion of said axial thrust force;
   wherein the stator windings or the rotor windings are skewed to exert an opposing axial thrust force on said input shaft, so that the axial thrust force carried by said at least one bearing is reduced.

2. The wind turbine of claim 1, wherein the gearbox output shaft and the generator input shaft are a single common shaft.

3. The wind turbine of claim 1, wherein the stator windings are skewed.

4. The wind turbine of claim 1, wherein the rotor windings are skewed.

5. The wind turbine of claim 1, wherein the gearbox housing is attached to the generator housing.

6. The wind turbine of claim 1, wherein the at least one gear stage of said gearbox has at least one of a left-hand skew and a right-hand skew, and wherein the stator windings have at least one of a left-hand skew and a right-hand skew.

7. The wind turbine of claim 1, wherein the at least one gear stage of said gearbox has at least one of a left-hand skew and a right-hand skew, and wherein the rotor windings have at least one of a left-hand skew and a right-hand skew.

8. A wind turbine having a drivetrain, said drivetrain comprising:

a gearbox comprising a gearbox housing, at least one gear stage and an output shaft rotatably coupled within said housing, said at least one gear stage exerting an axial thrust force on said output shaft during operation of said wind turbine;

a generator comprising a generator housing and an input shaft, the input shaft of said generator connected to the output shaft of said gearbox, the generator further comprising a stator and a rotor, said stator coupled to said generator housing, said rotor coupled to said input shaft such that said rotor is positioned radially inward from said stator, the generator including stator windings and rotor windings;

at least one bearing shared between the gearbox output shaft and the generator input shaft, said at least one bearing carrying at least a portion of said axial thrust force;

wherein the stator windings or the rotor windings are skewed to reduce at least one of torque ripple and cogging torque.

9. The wind turbine of claim 8, wherein the gearbox output shaft and the generator input shaft are a single common shaft.

10. The wind turbine of claim 8, wherein the stator windings are skewed.

11. The wind turbine of claim 8, wherein the rotor windings are skewed.

12. The wind turbine of claim 8, wherein the gearbox housing is attached to the generator housing.

13. The wind turbine of claim 8, wherein the at least one gear stage of said gearbox has at least one of a left-hand skew and a right-hand skew, and wherein the stator windings have at least one of a left-hand skew and a right-hand skew.

14. The wind turbine of claim 8, wherein the at least one gear stage of said gearbox has at least one of a left-hand skew and a right-hand skew, and wherein the rotor windings have at least one of a left-hand skew and a right-hand skew.

15. A wind turbine having a drivetrain, said drivetrain comprising:

a gearbox comprising a gearbox housing, at least one gear stage and an output shaft rotatably coupled within said housing, said at least one gear stage exerting an axial thrust force on said output shaft during operation of said wind turbine;

a generator comprising a generator housing and an input shaft, the input shaft of said generator connected to the output shaft of said gearbox, the generator further comprising a stator and a rotor, said stator coupled to said generator housing, said rotor coupled to said input shaft such that said rotor is positioned radially inward from said stator, the generator including stator windings and rotor windings;

at least one bearing shared between the gearbox output shaft and the generator input shaft, said at least one bearing carrying at least a portion of said axial thrust force;

wherein the stator windings or the rotor windings are skewed to exert an opposing axial thrust force on said input shaft, so that the axial thrust force carried by said at least one bearing is reduced, and at least one of torque ripple and cogging torque is reduced.

16. The wind turbine of claim 15, wherein the gearbox output shaft and the generator input shaft are a single common shaft.

17. The wind turbine of claim 15, wherein the gearbox housing is attached to the generator housing.

18. The wind turbine of claim 15, wherein the at least one gear stage of said gearbox has at least one of a left-hand skew and a right-hand skew, and wherein the stator windings have at least one of a left-hand skew and a right-hand skew.

19. The wind turbine of claim 15, wherein the at least one gear stage of said gearbox has at least one of a left-hand skew and a right-hand skew, and wherein the rotor windings have at least one of a left-hand skew and a right-hand skew.

20. A wind turbine having a drivetrain, said drivetrain comprising:

a gearbox comprising at least one gear stage and an output shaft, the at least one gear stage exerting an axial thrust force on the output shaft;

a generator comprising an input shaft connected to the output shaft of the gearbox, the generator further comprising a stator and a rotor positioned radially inward from the stator, the generator including stator windings and rotor windings;

at least one bearing shared between the gearbox output shaft and the generator input shaft, the at least one bearing carrying at least a portion of the axial thrust force; and wherein the stator windings or the rotor windings are skewed to exert an opposing axial thrust force on the input shaft, so that the axial thrust force carried by the at least one bearing is reduced.

21. The wind turbine of claim 20, wherein the gearbox output shaft and the generator input shaft are a single common shaft.

22. The wind turbine of claim 20, wherein the stator windings are skewed.

23. The wind turbine of claim 20, wherein the rotor windings are skewed.

24. The wind turbine of claim 20, wherein the at least one gear stage of the gearbox has a left-hand skew or a right-hand skew, and wherein the stator windings have a left-hand skew or a right-hand skew.

25. The wind turbine of claim 20, wherein the at least one gear stage of said gearbox has a left-hand skew or a right-hand skew, and wherein the rotor windings have a left-hand skew or a right-hand skew.

* * * * *